(12) United States Patent
Cuenod et al.

(10) Patent No.: US 7,231,527 B1
(45) Date of Patent: Jun. 12, 2007

(54) METHOD OF MAKING SECURE THE USE OF A PIECE OF SOFTWARE BY MEANS OF A PROCESSING AND SECRET MEMORIZING UNIT, AND A SYSTEM CONSTITUTING AN APPLICATION THEREOF

(75) Inventors: Jean-Christophe Cuenod, Montesson (FR); Gilles Sgro, Bourg de Peage (FR)

(73) Assignee: Validy, Romans sur Isere (FR)

( * ) Notice: Subject to any disclaimer, the term of this patent is extended or adjusted under 35 U.S.C. 154(b) by 0 days.

(21) Appl. No.: 09/959,413

(22) PCT Filed: Apr. 27, 2000

(86) PCT No.: PCT/FR00/01120

§ 371 (c)(1),
(2), (4) Date: Oct. 26, 2001

(87) PCT Pub. No.: WO00/67093

PCT Pub. Date: Nov. 9, 2000

(30) Foreign Application Priority Data

Apr. 28, 1999 (FR) .................................... 99 05569

(51) Int. Cl.
*G06F 11/30* (2006.01)
*G06F 12/14* (2006.01)
*H04L 9/32* (2006.01)
*B23Q 15/00* (2006.01)
*G08B 13/00* (2006.01)

(52) U.S. Cl. .......................... 713/187; 226/26; 726/34

(58) Field of Classification Search ................. 713/187
See application file for complete search history.

(56) References Cited

FOREIGN PATENT DOCUMENTS

| EP | 0191162 A | 8/1986 |
| EP | 0768601 A1 | 4/1997 |
| EP | 0795809 A2 | 9/1997 |

OTHER PUBLICATIONS

"Dea-based Pseudorandom Number Generator", IBM Technical Disclosure Bulletin, US, IBM Corp. New York, vol. 35, No. 1B, Jun. 1, 1992, pp. 431-434.

*Primary Examiner*—Ayaz Sheikh
*Assistant Examiner*—Shin-Hon Chen
(74) *Attorney, Agent, or Firm*—Sughrue Mion, PLLC

(57) ABSTRACT

A method of making secure the use of a piece of software, the method consisting:
in a substage of generating modified data (D'):
for a first category of users possessing a generation unit ($11_g$) including at least one generation secret ($S_g$) to be able to obtain modified data (D'); and
for a second category of users not possessing the generation unit ($11_g$), to be able at best to generate original data (D) without being able to translate it in order to obtain modified data (D'); and
in a substage of reconstituting original data (D):
for a first category of users possessing a reconstitution unit including at least a reconstitution secret, to be able to restore the original data (D); and
for a second category of users not possessing the reconstitution unit, to be able at best to use the modified data (D').

8 Claims, 3 Drawing Sheets

METHOD OF MAKING SECURE THE USE OF A PIECE OF SOFTWARE BY MEANS OF A PROCESSING AND SECRET MEMORIZING UNIT, AND A SYSTEM CONSTITUTING AN APPLICATION THEREOF

TECHNICAL FIELD

The present invention relates to the technical field of data processing systems in the broad sense and more particularly, it relates to means for making secure the use of a program or a piece of software operating on said data processing systems.

More particularly, the subject matter of the invention relates to means for making secure the use of a piece of software by means of a processing and secret memorizing unit, commonly referred to as a "smart card".

PRIOR ART

In the above technical field, the main drawback relates to unauthorized use of a piece of software by users who have not paid a license fee. Such illegal use of a piece of software is clearly detrimental for publishers and distributors of software. To avoid such illegal copies, various solutions for protecting a piece of software have been proposed in the state of the art. Thus, one known solution consists in making use of a hardware protection system, such as a physical element known as a protective key or "dongle". Such a protective key is intended to guarantee to the publisher of the piece of software that the piece of software is executed solely when in the presence of the key.

Unfortunately, it has been found that that solution is ineffective since it suffers from the drawback of being easily overcome. By using specialized tools such as disassemblers, a dishonest user or "pirate" can remove the dongle-checking instructions. It then becomes possible to make illegal copies corresponding to versions of the piece of software that have been modified so that they no longer have any protection. In addition, that solution cannot be generalized to all software insofar as it is difficult to connect more than two such protective keys on the same machine.

Patent application No. EP 0 191 162 describes a method for encrypting a piece of software so as to avoid unauthorized use. Such a method consists in encrypting the program by means of a unique key, in storing the encrypted program on a medium for distribution purposes, and in executing the program on a computer having protected memory and protected cryptographic means including a secret key that is unique for that computer. The method consists in providing the user of the program with a unique secret password that depends on the key of the program and on the key of the computer so that the computer can decrypt and execute the program in its protected memory. In a second implementation, a smart card possessing a unique key can be associated with the computer so that under such circumstances the unique secret password supplied to the user depends on the key of the program and on the key of the smart card.

The major drawback of that method is the need to use a computer having protected memory in order to run the program. Standard computers do not have protected memory, thus considerably limiting the popularity of that method.

Another drawback is that implementing it requires the user to apply to a password distribution center for the password that corresponds to the program and that depends on the user's computer or smart card.

Another drawback of that method is that it needs as many secrets as there are smart cards and it requires the password distribution center to manage all of those secrets.

SUMMARY OF THE INVENTION

The invention seeks to remedy the drawbacks of the prior art by proposing a method for making secure the use of a piece of software by means of a processing and secret memorizing unit, which method is designed for implementation on a standard computer and does not require the user to make any application to a password distribution center.

To achieve this object, the method of the invention seeks to make secure the use of a piece of software by means of at least one processing and secret memorizing unit, with the piece of software running on a data processing system.

According to the invention, the method consists, during a stage of using the piece of software:
  in a substage of generating modified data:
    for a first category of user possessing a generation unit including at least one generation secret in enabling the following:
      use of the piece of software to establish "original" data associated with said piece of software;
      selection of at least one generation input parameter constituted by at least a portion of the original data;
      transfer of the generation input parameter from the generation data processing system to the generation processing and memorizing unit;
      use of the generation unit to determine at least one generation output parameter from the generation secret and the generation input parameter;
      transfer of the generation output parameter from the generation unit to the generation system; and
      implementation of at least one generation function using at least part of the generation output parameter to obtain modified data;
    for a second category of user not possessing the generation unit to be able at best to generate the original data without being able to translate it in order to obtain modified data; and
  in a substage of reconstituting original data:
    for a first category of user possessing a reconstitution unit including at least one reconstitution secret enabling the modified data to be modified in inverse manner to return to the original data:
      by selecting a first reconstitution input parameter constituted by at least a portion of the modified data;
      by transferring the reconstitution input parameter from the reconstitution data processing system to the reconstitution unit;
      by using the reconstitution unit to determine at least one reconstitution output parameter on the basis of the reconstitution secret and the reconstitution input parameter;
      by transferring the reconstitution output parameter from the reconstitution unit to the reconstitution system; and
      by implementing at least one reconstitution function using at least part of the reconstitution output parameter in order to obtain the original data; and
    for a second category of user not possessing the reconstitution unit, to be able at best to use the modified data.

The method of the invention does not rely on encrypting the piece of software before it is distributed, but rather on modifying data that is generated while the piece of software is in use. The use of a processing and secret memorizing unit makes it possible to modify the data in a manner that is not predictable and to reconstitute the original data so that it can be used. It should be observed that the processing and memorizing unit is supplied when the piece of software is purchased, so the user does not need to make any application to an organization for distributing passwords.

The method of the invention thus enables use of a piece of software to be made secure by implementing a processing and secret memorizing unit which presents the feature of keeping information confidential even after the secret has been used several times. It can thus be seen that any derivative version of the piece of software attempting to operate without the processing and secret memorizing unit that corresponds thereto will be incapable of generating or of making use of data produced by the original piece of software insofar as the secret contained in the processing and secret memorizing unit is not available. The use of such a secret makes it possible to modify the format with which data is stored in a manner that is not predictable, such that using modified data does not enable the piece of software to function properly unless the user is in possession of the secret. The subject matter of the invention finds a particularly advantageous application with software for exchanging data, such as software for publishing or for archiving, for example.

Various other characteristics appear from the following description given with reference to the accompanying drawings which show embodiments and implementations of the invention as non-limiting examples.

BEST MANNER OF PERFORMING THE INVENTION

Figure 1:
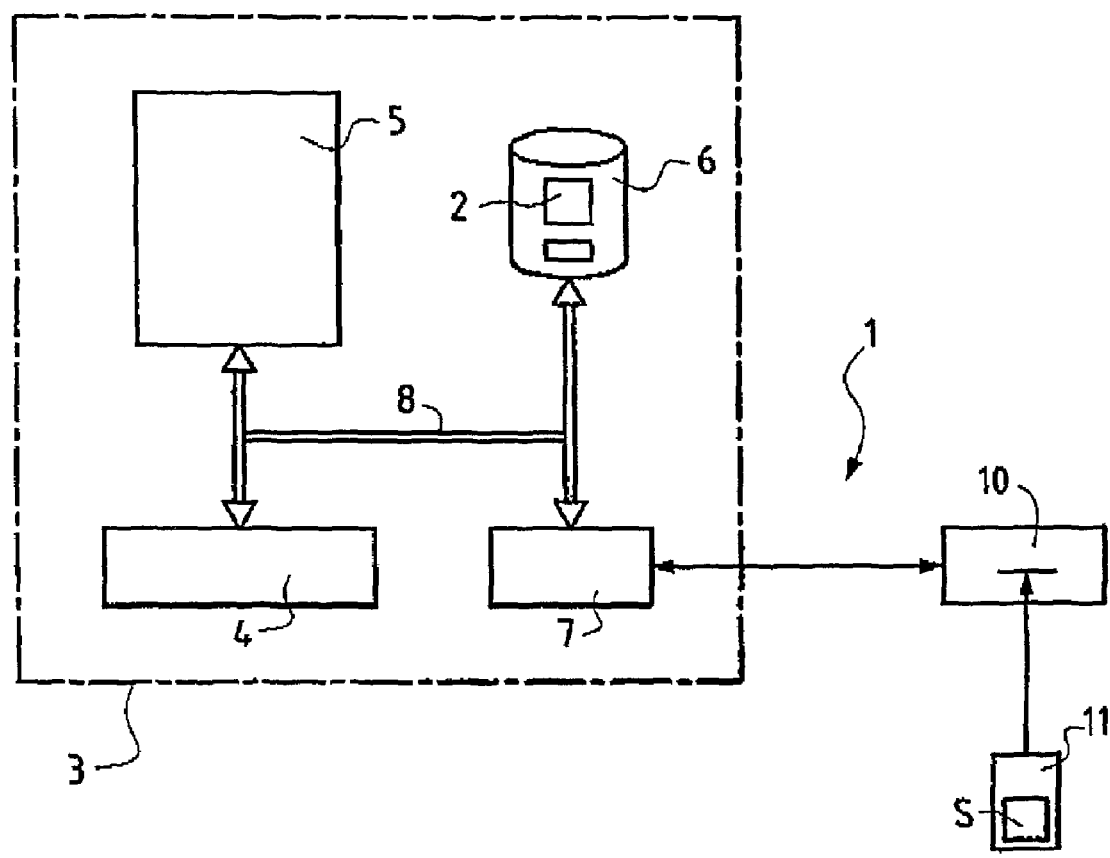
FIG. 1 is a block diagram showing a hardware embodiment enabling the invention to be implemented.

FIG. 1 shows an embodiment of apparatus 1 for making secure the use of a program or a piece of software 2 in the broad sense. The security apparatus 1 comprises a data processing system 3 of any conventional type. In the example described, the data processing system 3 comprises a computer, but it must be understood that such a data processing system 3 could form an integral portion of various kinds of machine, device, or vehicle in the general sense. In the example described, the data processing system 3 comprises at least one processor 4, at least one working memory 5, at least one data storage medium 6, and at least one input/output interface circuit 7. Conventionally, the various components of the data processing system 3 are interconnected via a communication bus 8. The interface circuit 7 is connected to a reader 10 for reading a unit 11 for processing and storing at least one secret. In the example shown, the processing and memorizing unit is a smart card designed to be written to or read from by the reader 10, but it must be understood that such a processing and memorizing unit 11 could be in the form of a hardware key of any type, connected to an input/output circuit, directly to the communication bus 8, or by any other communication means, such as a wireless link, for example. In general, the processing and memorizing unit 11 contains at least one secret or one device for storing coded information S, at least algorithmic means for processing data, and at least a system for exchanging data between the unit 11 and the data processing system 3. Conventionally, the processing and memorizing unit 11 is implemented as a smart card.

The above-described apparatus 1 makes it possible to implement a method for making secure the use of the piece of software 2. To do this, the stage of using the piece of software 2 is considered as being made up of three substages, namely:
  a "functional" substage during which the user makes use of the functions of the piece of software;
  a substage of creating or generating modified data, the modified data corresponding to original data created or generated by the piece of software and in need of protection; and
  a substage of reconstituting original data enabling the piece of software to be used with the modified data.

Thus, while the apparatus 1 is being used in a generating substage, a subscript g is added to the references for the component elements of such apparatus 1. During the stage of use, or more precisely of reconstitution, a subscript u is added to the references for the elements constituting the apparatus 1. It should be observed that the data processing systems $3_g$ and $3_u$ can be identical or different and that the processing and memorizing units $11_g$ and $11_u$ can be identical or different.

Figure 2A:
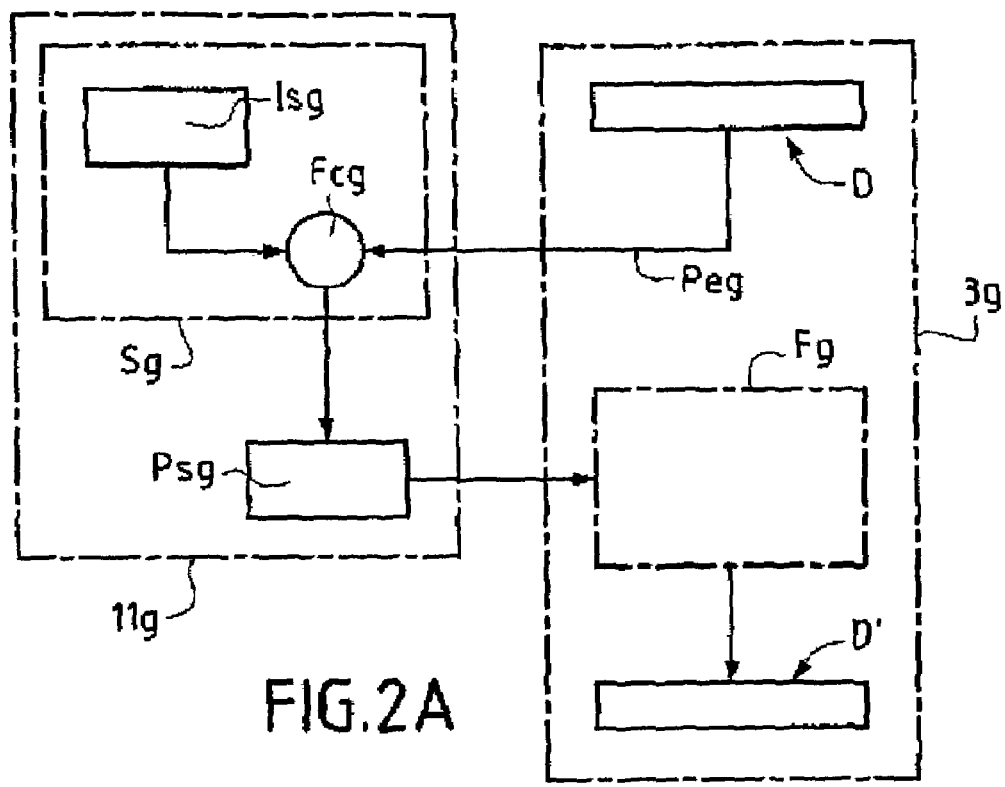
FIGS. 2A and 2B are block diagrams relating respectively to generating modified data associated with a piece of software and to reconstituting the original data, in a first variant implementation.
Figure 2B:
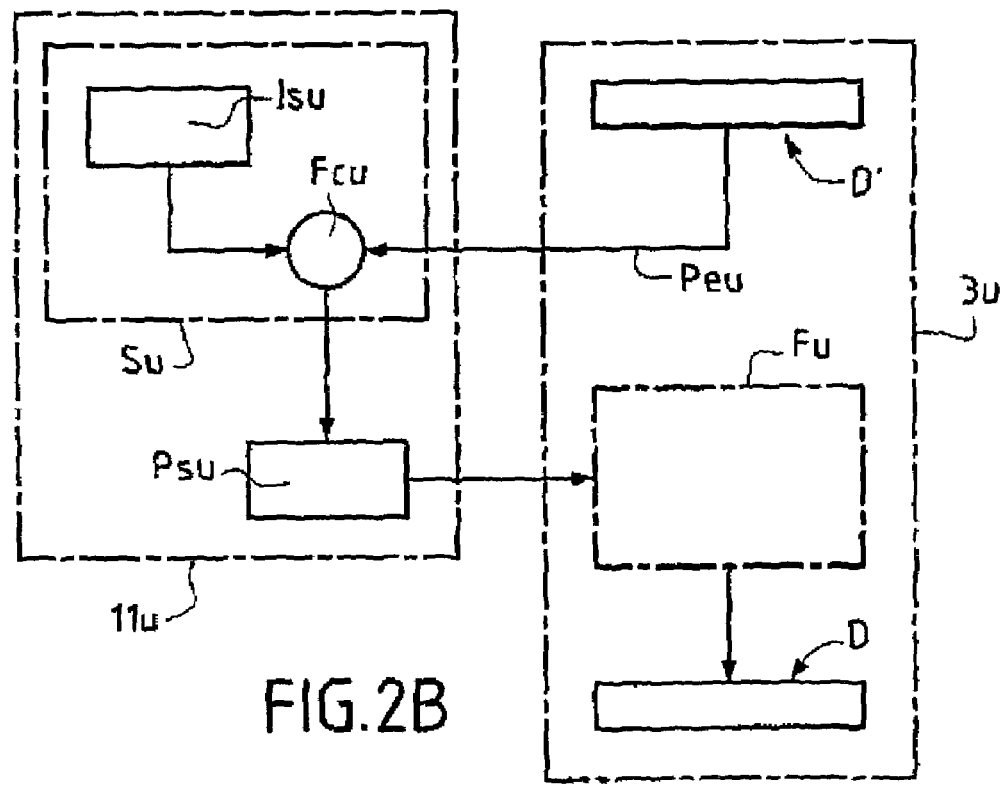

FIGS. 2A and 2B show a first implementation of a method of translating or encoding data associated with given piece of software. More precisely, FIG. 2A shows the substage of generating modified data D', while FIG. 2B describes the substage of reconstituting original data.

In the "generation" data processing substage, the piece of software 2 creates or generates "original" data D associated with the piece of software 2 (FIG. 2A). The original data D constitutes data that needs to be protected given its economically-sensitive nature. It should be understood that the original data D is data interchanged by the piece of software, but not necessarily data that is essential for enabling the piece of software to operate. By way of example, the original data D can be constituted by a file for exchanging data for a word processor program or for a graphics editor program. During this generation substage, the original data D is modified to obtain modified data D' which is used for data exchange purposes instead of the original data D. During the "reconstitution" substage, the modified data D' is translated back so as to enable the original data D to be reconstituted. In most cases, the piece of software 2 is capable of both modifying and reconstituting data.

In accordance with the invention, a generation input parameter $P_{eg}$ is selected for the "generating" processing and memorizing unit $11_g$ which is referred to as the generating unit $11_g$ in the description below. In the implementation shown in FIG. 2A, the generation input parameter $P_{eg}$ is constituted by at least a portion or all of the original data D. Naturally, the generation input parameter $P_{eg}$ can also include, in association with the original data D, other data that is not associated with the piece of software 2.

The generation input parameter $P_{eg}$ is transferred from the "generation" data processing system $3_g$, referred to below as the generation system $3_g$, to the generation unit $11_g$. The generation unit $11_g$ is adapted to determine at least one generation output parameter $P_{sg}$ from at least one generation secret $S_g$ and the generation input parameter $P_{eg}$. In conventional manner, the generation unit $11_g$ contains at least one generation secret $S_g$.

It should be observed that the generation secret $S_g$ can be constituted either by at least one secret function which responds to the generation input parameter $P_{eg}$ by generating the generation output parameter $P_{sg}$, or by at least one piece of secret information $I_{sg}$ and at least one conversion function $F_{cg}$ which can optionally be known, making it possible to use the generation input parameter $P_{eg}$ and the secret information $I_{sg}$ to generate the generation output parameter $P_{sg}$. In the examples shown, the generation secret $S_g$ is constituted by a piece of secret information $I_{sg}$ and by a conversion function $F_{cg}$. The way the generation unit $11_g$ is implemented makes it possible, when the generation secret $S_g$ is not known, to ensure that deducing the generation output parameter $P_{sg}$ from the generation input parameter $P_{eg}$ is difficult, if not impossible.

The generation output parameter $P_{sg}$ is transferred from the generation unit $11_g$ to the generation system $3_g$. The generation system $3_g$ is adapted to implement at least one generation function $F_g$ making use, at least in part, of the generation output parameter $P_{sg}$ in order to obtain the modified data D'. In the implementation shown in FIG. 2A, the generation function $F_g$ delivers modified data D' based on the generation output parameter $P_{sg}$. In other words, the modified data D' corresponds to the generation output parameter $P_{sg}$.

It should be observed that during the generation substage, two categories of users arise. Thus, a first category of users possessing a generation unit $11_g$ containing the generation secret $S_g$ is able to translate original data D in order to obtain modified data D', while a second category of users not possessing the generation unit $11_g$, i.e. the generation secret $S_g$ can do no better than generate original data D without being able to translate it in order to obtain modified data D'.

FIG. 2B shows the method enabling the inverse translation to be performed, on data D' modified using the principles described above with reference to FIG. 2A so as to recover or reconstitute the original data D. Thus, in such a substage of reconstituting original data, the method of the invention is implemented using a "reconstitution" data processing system $3_u$ that can be identical to or different from the generation system $3_g$. The reconstitution data processing system $3_u$ is referred to as the reconstitution system $3_u$ in the description below.

The method consists in selecting a reconstitution input parameter $P_{eu}$ constituted by at least part of the modified data D'. In the implementation shown in FIG. 2B, the reconstitution input parameter $P_{eu}$ comprises at least all of the modified data D'.

The reconstitution input parameter $P_{eu}$ is transferred from the reconstitution system $3_u$ to the "reconstitution" processing and memorizing unit $11_u$, referred to as the reconstitution unit $11_u$ in the description below. This reconstitution unit $11_u$ includes at least one reconstitution secret $S_u$ which is identical to or different from the generation secret $S_g$, but which is suitable for making it possible to recover or reconstitute the original data D from the modified data D'. In the example shown, the reconstitution secret $S_u$ is constituted by a secret piece of information $I_{su}$ and by a conversion function $F_{cu}$ which can optionally be known.

The reconstitution unit $11_u$ determines at least one reconstitution output parameter $P_{su}$ from the reconstitution secret $S_u$ and from the reconstitution input parameter $P_{eu}$. Thereafter, the reconstitution unit $11_u$ transfers the reconstitution output parameter $P_{su}$ to the reconstitution system $3_u$. The reconstitution system $3_u$ implements at least one reconstitution function $F_u$ making use, at least in part, of the reconstitution output parameter $P_{su}$ in order to obtain the original data D. In the implementation shown in FIG. 2B, the reconstitution function $F_u$ delivers the original data D from the reconstitution output parameter $P_{su}$. In other words, in a preferred embodiment of this variant, the original data D corresponds to the reconstitution output parameter $P_{su}$.

In the preferred embodiment of the implementation shown in FIGS. 2A and 2B, the original data D is transferred to the generation unit $11_g$ which delivers the modified data D'. Similarly, in the reconstitution substage, the modified data D' is transferred to the reconstitution unit $11_u$ which delivers the original data D.

From the above description, it can be seen that two categories of user arise during this reconstitution substage. Thus, a user possessing a reconstitution unit $11_u$ including the reconstitution secret $S_u$ associated with a particular piece of software can reconstitute and use original data associated with said piece of software. However, a user not possessing the corresponding reconstitution unit $11_u$, i.e. the reconstitution secret $S_u$, can use the piece of software without the original data D and at best with the modified data D'.

The method of the invention is genuinely effective even when the conversion functions $F_{eg}$ and $F_{cu}$ are known and even when the generation and the reconstitution functions $F_g$ and $F_u$ and the generation and reconstitution input parameters $P_{eg}$ and $P_{eu}$ and the regeneration and reconstitution output parameters $P_{sg}$ and $P_{su}$ are all observable and modifiable by a dishonest person. However it is important for the generation and reconstitution secrets $S_g$ and $S_u$ to be kept secret. A dishonest person cannot discover how data D is modified into D' or the inverse modification of data D' into D. Such a person can clearly modify the piece of software 2 so that it no longer requires the processing and memorizing unit. Under such circumstances, the data generated by such pirate piece of software can be used by the pirate piece of software. Nevertheless, the pirate piece of software cannot create data suitable for use by the original piece of software 2 nor can it use data generated by the original piece of software 2. Users possessing the generation unit $11_g$ the reconstitution unit $11_u$, and the piece of software 2 can interchange data freely. Users possessing the pirate piece of software can also interchange data freely between one another, but data exchange between these two categories of user is difficult or even impossible.

Figure 3A:
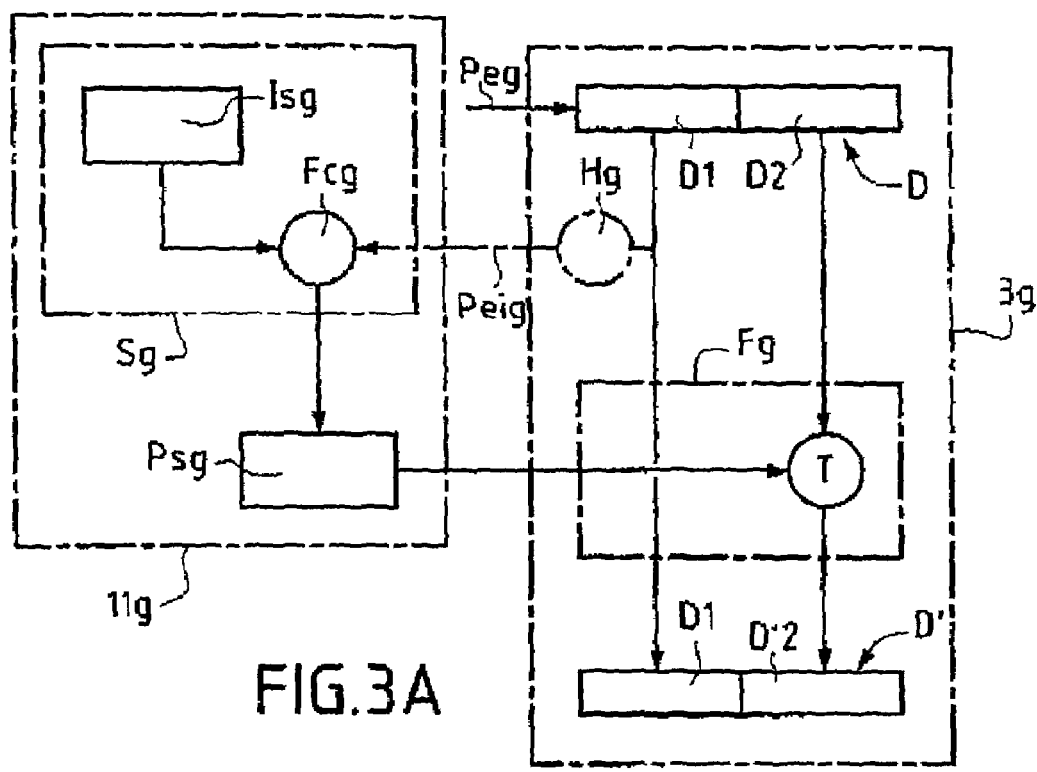
FIGS. 3A and 3B are block diagrams relating respectively to generating modified data and to reconstituting original data in a second variant implementation.
Figure 3B:
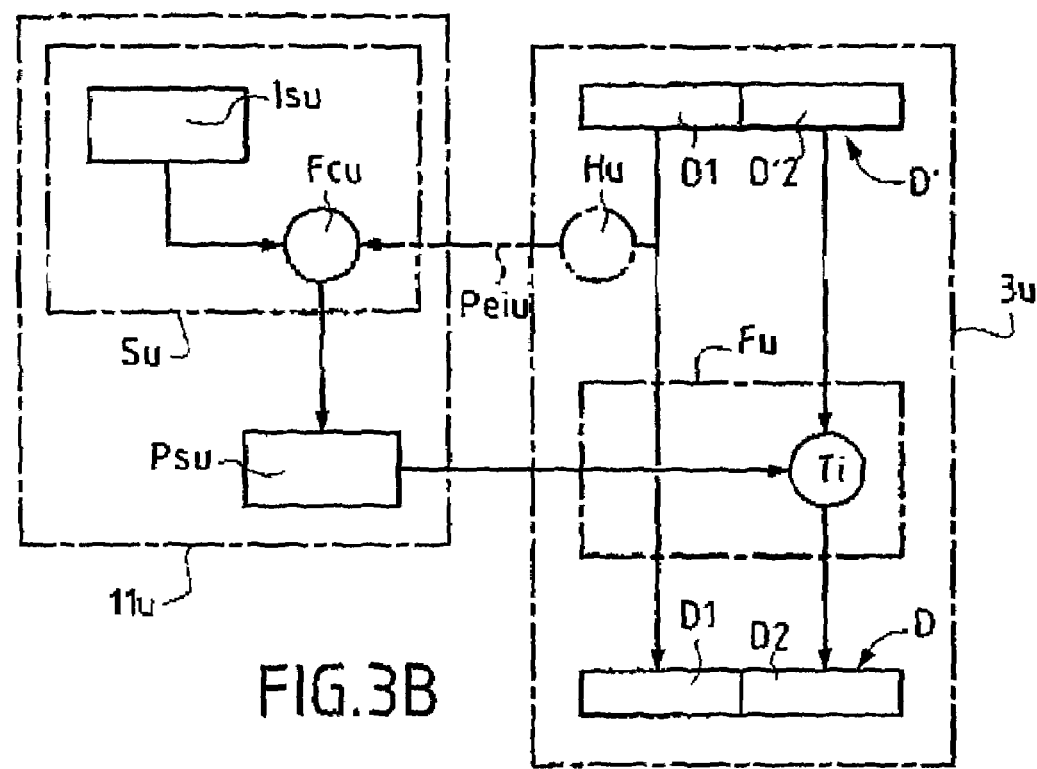

In the implementation shown in FIGS. 2A–2B, the original data D is transferred in full to the processing and memorizing unit. To improve the speed of the apparatus, FIGS. 3A–3B show a preferred variant implementation of the security method of the invention. Naturally, elements common to the example described above retain references that are identical and they are not explained again.

In the implementation shown in FIG. 3A, it should be understood that the original data D comprises at least a first portion $D_1$ and a second portion $D_2$. In the implementation shown in FIG. 3A, the generation input parameter $P_{eg}$ is constituted by the first portion $D_1$ of the original data D. Naturally, the way in which the original data D is split into two portions is completely arbitrary. The generation input parameter $P_{eg}$, i.e. in the example shown the first portion $D_1$ of the original data, is thus transferred from the generation system $3_g$ to the generation unit $11_g$. The generation unit $11_g$ determines the generation output parameter $P_{sg}$ on the basis of the generation secret $S_g$ and the first portion $D_1$ of the data.

The generation output parameter $P_{sg}$ is transferred from the generation unit $11_g$ to the generation system $3_g$. The original data D is then modified in order to obtain modified data D' using at least one generation function $F_g$ that includes a translation function T serving to translate only the second portion $D_2$ of the original data in order to obtain a modified second portion $D'_2$ of the data. By way of example, the translation function T can be constituted by a function that can be inverted, and uses the generation output parameter $P_{sg}$ for its translation operation. As shown in FIG. 3A, the generation function $F_g$ is adapted to ensure that the modified data D' also includes the first portion $D_1$ of the original data. Thus, the modified data D' is constituted by the first portion $D_1$ of the original data together with the modified second portion $D'_2$ of the data. The modified data D' thus comprises both a non-modified portion $D_1$ used to determine the generation output parameter $P_{sg}$ on the basis of a generation secret $S_g$, and also a second portion $D'_2$ that has been encoded on the basis of the generation output parameter $P_{sg}$.

FIG. 3B shows the method for performing the inverse translation, on the data D' modified as described above with reference to FIG. 3A. FIG. 3B thus shows the substage for reconstituting the original data D.

The method splits the modified data D' into a first portion and a second portion. In the implementation shown in FIGS. 3A and 3B, the first and second portions of the modified data D' are selected respectively to be the first portion $D_1$ of the original data and the modified second portion $D'_2$ of the data. The first portion of the modified data D', i.e. $D_1$ is transferred from the reconstitution system $3_u$ to the reconstitution unit $11_u$. The reconstitution unit $11_u$ then determines at least one reconstitution output parameter $P_{su}$ on the basis of a reconstitution secret $S_u$ and the first portion of the modified data, i.e. $D_1$.

Thereafter, the reconstitution unit $11_u$ transfers the reconstitution output parameter $S_u$ from the reconstitution unit $11_u$ to the reconstitution system $3_u$. By using a reconstitution function $F_u$, the reconstitution system $3_u$ serves to modify the modified data D' in order to return to the original data D. The reconstitution function $F_u$ includes an inverse translation function $T_i$ which enables the second portion of the modified data to be translated using the reconstitution output parameter $P_{su}$ so as to return to the original data D. By way of example, the inverse translation function $T_i$ can be constituted by the function which is the inverse of the translation function T or by a combination of elementary functions that is equivalent. In the implementation shown in FIGS. 3A and 3B, the inverse translation function $T_i$ uses the reconstitution output parameter $P_{su}$ to translate the modified second portion $D'_2$ of the data so as to recover the second portion $D_2$ of the original data. In addition, the reconstitution function $F_u$ is adapted to incorporate the first portion $D_1$ of the data in the original data D. Thus, the original data D is reconstituted as the first portion $D_1$ of the original data plus the second portion $D_2$ of the original data.

According to a preferred characteristic of the implementation associated with the example described in FIGS. 3A and 3B, the first portion $D_1$ of the original data that is to be transferred to the processing and memorizing unit is processed so as to reduce the number of processing operations that said unit needs to perform. The first portion $D_1$ of the original data is thus supplied to the input of at least one generation intermediate translation function $H_g$ such as a non-invertible function, e.g. a function of the "one-way hash" type, so as to obtain at least one generation intermediate input parameter $P_{eig}$. This generation intermediate input parameter $P_{eig}$ as determined by the generation system $3_g$ is transferred from said system to the generation unit $11_g$ in such a manner as to enable the unit to determine the output parameter $P_{sg}$ on the basis of the generation secret $S_g$ and the input parameter constituted by the generation intermediate input parameter $P_{eig}$. Naturally, when translating the modified data D' to return to the original data D (FIG. 3B), the reconstitution system $3_u$ defines the reconstitution intermediate input parameter $P_{eiu}$ on the basis of the first portion $D_1$ of the original data and by using a reconstitution intermediate translation function Hu such as a non-invertible function, e.g. of the "one-way hash" type. This reconstitution intermediate input parameter $P_{eiu}$ is transferred to the reconstitution unit $11_u$ to enable the reconstitution output parameter $P_{su}$ to be determined.

According to a preferred implementation characteristic of the invention, the modified data D' is written or recorded on the data storage medium 6 associated with the data processing system 3 in order to enable the modified data D' to be reconstituted during the reconstitution substage of the piece of software 2. Naturally, the data storage medium 6 can be constituted in any known manner, for example a hard disk, a magnetic tape, a CD-ROM, or any other device used for the purpose of storing or transmitting such data.

In the examples described above, it can be seen that in the generation substage, the modified data is obtained during a processing step implementing a generation output parameter $P_{sg}$ and a generation secret $S_{sg}$. Naturally, provision can be made to start this processing step over n times in order to increase the complexity with which the data is encoded. Thus, the following operations can be restarted as many times as necessary, i.e.:

splitting up the previously obtained modified data into at least first and second portions;

determining at least one generation output parameter on the basis of a function of a portion of the data and one or more secrets that are different or identical to the secret(s) used previously;

modifying the other portion of the data by a translation function that is identical to or different from that used previously; and constituting modified data after each stage of data modification.

In this implementation, during the reconstitution substage, the operations of translating the modified data to reconstitute the original data are repeated in the reverse order a number of times n that is identical to the number of steps performed during the substage of generating the modified data.

In a preferred variant of the implementation illustrated in FIGS. 3A and 3B, the original data D is split into two portions $D_1$ and $D_2$ of substantially equivalent sizes. After a first processing step, modified data D' is obtained that is constituted by the first portion $D_1$ of the original data and the modified second portion $D'_2$ of the data. In a second processing step, the roles of the portions $D_1$ and $D'_2$ are interchanged. Thus, the second modified portion $D'_2$ of the data is used as an input parameter of the generation unit $11_g$ while the first portion $D_1$ of the original data is modified by a translation function. This ensures that all of the original data D is modified. Naturally, during the reconstitution substage, the inverse operations are performed in order to recover the original data D.

The method of the invention as described above can be implemented with various translation functions T depending on the objectives desired by the publisher of the protected piece of software. For example, the translation function T can be an encrypting function. Under such circumstances, the translated data is naturally incomprehensible. In another example, the translation function T can be a function for performing minor pseudo-random modifications to the digits contained in the original data. This enables the user of pirated piece of software to use data generated by the original version of the piece of software, but the data is erroneous. Likewise, a user of original piece of software can use data generated by pirated piece of software, but that data is likewise erroneous.

The invention claimed is:

1. A method of making secure the use of a piece of software during a stage of using the piece of software by means of at least one unit for processing and storing at least one secret, the piece of software running on a data processing system, the method comprising:

(a)→in a substage of generating modified data:
  (1) for a first category of user possessing the unit, called in this substage the generation unit, including at least the secret, called in this substage the generation secret, in enabling the following:
    (i) using the piece of software to establish original data associated with said piece of software;
    (ii) selecting at least one generation input parameter constituted by at least a portion of the original data;
    (iii) transferring the generation input parameter from the data processing system, called in this substage the generating system to the generation unit;
    (iv) using the generation unit to determine at least one generation output parameter from the generation secret and the generation input parameter;
    (v) transferring the generation output parameter from the generation unit to the generation system; and
    (vi) implementing at least, one generation function using at least part of the generation output parameter to obtain modified data;
  (2) for a second category of user not possessing the generation unit to be able at best to generate the original data without being able to translate it in order to obtain modified data; and (b)→in a substage of reconstituting original data:
  (1) for a first category of user possessing the unit, called in this substage the reconstitution unit, including at least the secret, called in this substage the reconstitution secret, enabling the modified data to be modified in inverse manner to return to the original data:
    (i) by selecting a reconstitution input parameter constituted by at least a portion of the modified data;
    (ii) by transferring the reconstitution input parameter from the data processing system, called in this substage the reconstitution system, to the reconstitution unit;
    (iii) by using the reconstitution unit to determine at least one reconstitution output parameter on the basis of the reconstitution secret and the reconstitution input parameter;
    (iv) by transferring the reconstitution output parameter from the reconstitution unit to the reconstitution system; and
    (v) by implementing at least one reconstitution function using at least part of the reconstitution output parameter in order to obtain the original data; and
  (2) for a second category of user not possessing the reconstitution unit, to be able at best to use the modified data, wherein the method further comprises in the substage of generating modified data:
  (a) in splitting the original data into at least a first portion and a second portion;
  (b) in determining the generation output parameter from the generation secret and the generation input parameter which is constituted, at least in part, by the first portion of the original data; in using a translation function forming a portion of the generation function to modify only the second portion of the original data.

2. A method of making secure the use of a piece of software during a stage of using the piece of software by means of at least one unit for processing and storing at least one secret, said piece of software running on a data processing system, the method comprising:

(a) in a substage of generating modified data where said data processing system is called the generation system, said unit is called the generation unit and said secret is called the generation secret:
  (1) for a first category of user possessing said generation unit, including at least said generation secret, in enabling the following:
    (i) using said piece of software on said generation system, to establish original data associated with said piece of software;
    (ii) splitting said original data into a first portion of the original data and a second portion of the original data;
    (iii) establishing a generation input parameter with at least a part of said first portion of the original data;
    (iv) transferring said generation input parameter from said generation system to said generation unit;
    (v) using said generation unit to determine a generation output parameter from at least a part of said generation secret and a part of said generation input parameter;
    (vi) transferring said generation output parameter from said generation unit to said generation system;
    (vii) using a translation function and at least a part of said generation output parameter on said generation system to transform said second portion of the original data into a modified second portion; and
    (viii) using a generation function concatenating said first portion of the original data and said modified second portion to obtain modified data; and
  (2) for a second category of user not possessing said generation unit to be able at best to generate said original data without being able to translate it in order to obtain said modified data; and (b) in a substage of reconstituting original data where said data processing system is called the reconstitution system, said unit is called the reconstitution unit and said secret is called the reconstitution secret:
  (1) for a first category of user possessing said reconstitution unit, including at least said reconstitution secret, enabling said modified data to be modified in inverse manner to return to said original data by performing the following:
    (i) using said reconstitution system, to split said modified data back into said first portion of the original data and said modified second portion;
    (ii) establishing a reconstitution input parameter with at least a part of said first portion of the original data;
    (iii) transferring said reconstitution input parameter from said reconstitution system, to said reconstitution unit;

(iv) using said reconstitution unit to determine a reconstitution output parameter from at least a part of said reconstitution secret and a part of said reconstitution input parameter;

(v) transferring said reconstitution output parameter from said reconstitution unit to said reconstitution system;

(vi) using an inverse translation function and at least a part of said reconstitution output parameter on said reconstitution system to transform back said modified second portion into said second portion of the original data; and (vii) using a reconstitution function concatenating said first portion of the original data and said second portion of the original data in order to obtain back said original data; and (2) for a second category of user not possessing said reconstitution unit, to be able at best to use said modified data.

3. A method according to claim 2, further comprising:

(a) in the substage of generating modified data, in establishing the input generation parameter with at least a part of the output of a compression function using as input at least a part of the first portion of the original data; and (b) in the substage of reconstituting original data, in establishing the input reconstitution parameter with at least a part of the output of said compression function using as input at least a part of the first portion of the original data.

4. A method according to claims 2 or 3, further comprising writing the modified data on a permanent data storage medium associated with the data processing system to enable the modified data to be used during the substage of reconstituting the original data.

5. A method according to claims 2 or 3, further comprising:

(a) in the substage of generating modified data, in repeating the following operations n times, where n>1:

(1) splitting the previously obtained modified data into first and second portions;

(2) determining at least one generation output parameter from a function of one or more generation secrets that are different from or identical to those used previously and from a portion of the data; and (3) modifying the other portion of the data by a translation function that is identical to or different from that used previously and making up modified data after each data modification; and (b) in the substage of regenerating original data, performing the regenerating operations in reverse order the proper number of times in order to obtain the original data back.

6. A method according to claims 2 or 3, further comprising:

(a) in the substage of generating modified data:

(1) in a first processing step:

(i) in splitting the original data into a first portion and a second portion; and (ii) in making up modified data comprising the first portion of the original data and the modified second portion of the data; and (2) in a second processing step, in exchanging the roles of the two portions and in repeating the transformation in such a way that all the original data is modified; and (b) in the substage of regenerating original data, performing the regenerating operations in reverse order the proper number of times in order to obtain the original data back.

7. Apparatus for making secure the use of a piece of software, the apparatus comprising:

(a) a data processing system called the generation system, a unit for processing and storing at least one secret called respectively the generation unit and the generation secret, wherein:

(1) said generation system comprises means to establish original data associated with said piece of software;

(2) said generation system comprises means to split said original data into a first portion of the original data and a second portion of the original data;

(3) said generation system comprises means to establish a generation input parameter with at least a part of said first portion of the original data;

(4) said apparatus comprises means to transfer said generation input parameter from said generation system to said generation unit;

(5) said generation unit comprises means to determine a generation output parameter from at least a part of said generation secret and a part of said generation input parameter;

(6) said apparatus comprises means to transfer said generation output parameter from said generation unit to said generation system;

(7) said generation system, using at least a part of said generation output parameter, comprises means to translate said second portion of the original data into a modified second portion; and (8) said generation system comprises means to concatenate said first portion of the original data and said modified second portion to obtain modified data; and (b) a data processing system called the reconstitution system, a unit for processing and storing at least one secret respectively called the reconstitution unit and the reconstitution secret, wherein:

(1) said reconstitution system comprises means to split said modified data back into said first portion of the original data and said modified second portion;

(2) said reconstitution system comprises means to establish a reconstitution input parameter with at least a part of said first portion of the original data;

(3) said apparatus comprises means to transfer said reconstitution input parameter from said reconstitution system, to said reconstitution unit;

(4) said reconstitution unit comprises means to determine a reconstitution output parameter from at least a part of said reconstitution secret and a part of said reconstitution input parameter;

(5) said apparatus comprises means to transfer said reconstitution output parameter from said reconstitution unit to said reconstitution system;

(6) said reconstitution system, using at least a part of said reconstitution output parameter, comprises means to transform back said modified second portion into said second portion of the original data; and (7) said reconstitution system comprises means to concatenate said first portion of the original data and said second portion of the original data in order to obtain back said original data.

8. Apparatus according to claim 7, wherein:

(a) the input generation parameter is established with at least a part of the output of a compression function using as input at least a part of the first portion of the original data; and (b) the input reconstitution parameter is established with at least a part of the output of said compression function using as input at least a part of the first portion of the original data.

* * * * *